United States Patent
Laban et al.

(10) Patent No.: US 10,544,846 B2
(45) Date of Patent: Jan. 28, 2020

(54) SUSPENSION ASSEMBLY FOR A MACHINE

(71) Applicant: Caterpillar Inc., Deerfield, IL (US)

(72) Inventors: Christopher Scott Laban, East Peoria, IL (US); Jeffrey Lee Thomas, Washington, IL (US); Dennis Earl Roberts, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/288,616

(22) Filed: Feb. 28, 2019

(65) Prior Publication Data

US 2019/0195301 A1 Jun. 27, 2019

Related U.S. Application Data

(62) Division of application No. 15/467,581, filed on Mar. 23, 2017, now abandoned.

(51) Int. Cl.
*F16F 1/36* (2006.01)
*B62D 55/108* (2006.01)

(52) U.S. Cl.
CPC ............ *F16F 1/36* (2013.01); *B62D 55/1086* (2013.01)

(58) Field of Classification Search
CPC ................................ F16F 1/36; B62D 55/1086
See application file for complete search history.

(56) References Cited

U.S. PATENT DOCUMENTS

| | | | | | |
|---|---|---|---|---|---|
| 2,758,832 A | * | 8/1956 | Hickman | ............... | B60G 11/22 267/294 |
| 3,279,820 A | * | 10/1966 | Hickman | ............... | B60G 11/22 280/124.109 |
| 3,482,852 A | * | 12/1969 | Hickman | ................. | B60G 9/04 280/124.101 |
| 3,495,848 A | * | 2/1970 | Hickman | ................. | B60G 9/04 280/124.106 |
| 3,768,826 A | * | 10/1973 | Hickman | ................. | B60G 5/04 280/687 |
| 3,811,700 A | * | 5/1974 | Moore | ..................... | B60G 9/04 280/124.178 |
| 3,830,516 A | * | 8/1974 | Hickman | ............... | B60G 11/22 280/124.132 |
| 4,213,633 A | * | 7/1980 | Moore | ..................... | B60G 7/04 267/258 |
| 5,150,918 A | * | 9/1992 | Heitzmann | ............ | B60G 11/22 267/257 |
| 5,465,997 A | * | 11/1995 | Heitzmann | ............ | B60G 9/003 267/257 |
| 5,899,470 A | * | 5/1999 | Heitzmann | ............. | B60G 7/02 267/257 |

(Continued)

*Primary Examiner* — Paul N Dickson
*Assistant Examiner* — Joselynn Y Sliteris

(57) ABSTRACT

A suspension assembly for a machine is provided. The suspension assembly includes a first suspension structure and a second suspension structure. The first suspension structure includes a first suspension pad and a first support plate coupled to the first suspension pad. The first support plate has a first interlock component formed therein. The second suspension structure includes a second suspension pad and a second support plate coupled to the second suspension pad. The second support plate has a second interlock component formed therein. The second interlock component is complimentary to the first interlock component and configured to engage with the first interlock component.

4 Claims, 7 Drawing Sheets

(56) References Cited

U.S. PATENT DOCUMENTS 6,176,478 B1 * 1/2001 Heitzmann ............ B60G 11/12
267/269
10,144,262 B2 * 12/2018 Noble ...................... B60G 5/02

* cited by examiner

SUSPENSION ASSEMBLY FOR A MACHINE

CROSS-REFERENCE TO RELATED APPLICATION

This application is a divisional of U.S. patent application Ser. No. 15/467,581, filed on Mar. 23, 2017.

TECHNICAL FIELD

The present disclosure relates to a machine. More particularly, the present disclosure relates to a suspension assembly for the machine.

BACKGROUND

Machines, such as track-type machines, include a main frame supported on an undercarriage through an equalizer bar. The equalizer bar allows a degree of flexibility in the movement of the undercarriage relative to the main frame. Such a movement is typically dampened by one or more suspension pads provided between the mainframe and the equalizer bar. In operation, as the machine moves on a rough terrain, the main frame moves relative to the undercarriage thereby causing the suspension pads to be either relaxed (uncompressed) or compressed. The suspension pads are generally made of elastomeric material such as rubber, which compresses and dampens the movement of the main frame relative to the equalizer bar, thereby assisting in ride improvement for the operator.

Such suspension pads are installed as a stacked assembly coupled to each other and the equalizer bar by use of fasteners such as nuts and bolts. During compression of these suspension pads, these fasteners tend to interfere with each other and potentially cause damage to the suspension assembly of the machine. Additionally, such suspension pads are difficult to install and maintain.

There exists a need for an improved suspension assembly which is more durable, easy to install, and easy to maintain.

SUMMARY OF THE INVENTION

According to an aspect of the present disclosure, a suspension assembly for a machine is provided. The suspension assembly includes a first suspension structure and a second suspension structure. The first suspension structure includes a first suspension pad and a first support plate coupled to the first suspension pad. The first support plate has a first interlock component formed therein. The second suspension structure includes a second suspension pad and a second support plate coupled to the second suspension pad. The second support plate has a second interlock component formed therein. The second interlock component is complimentary to the first interlock component and configured to engage with the first interlock component.

In yet another aspect of the present disclosure, a machine is provided. The machine includes a mainframe, an under carriage and a suspension assembly. The main frame includes a laterally extending saddle member. The under carriage supports the main frame. The suspension assembly includes an equalizer bar having a central portion and a pair of distal end portions. The central portion is pivotally coupled to the saddle member and each of the pair of distal end portions are coupled to the under carriage. The suspension assembly further includes a first suspension structure and a second suspension structure. The first suspension structure includes a first suspension pad and a first support plate coupled to the first suspension pad. The first support plate has a first interlock component formed therein. The second suspension structure includes a second suspension pad and a second support plate coupled to the second suspension pad. The second support plate has a second interlock component formed therein. The second interlock component is complimentary to the first interlock component and configured to engage with the first interlock component.

BRIEF DESCRIPTION OF THE DRAWINGS

FIG. 7(a) illustrates an exemplary first support plate for a first suspension structure of the suspension assembly, according to a fifth embodiment of the present disclosure;

FIG. 7(b) illustrates an exemplary second support plate for a second suspension structure of the suspension assembly, according to the fifth embodiment of the present disclosure;

FIG. 7(c) illustrates assembling of the first support plate and the second support plate of the first suspension structure and the second suspension structure respectively, according to the fifth embodiment of the present disclosure; and FIG. 7(d) illustrates an assembled first support plate and the second support plate, according to the fifth embodiment of the present disclosure.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts.

Figure 1:
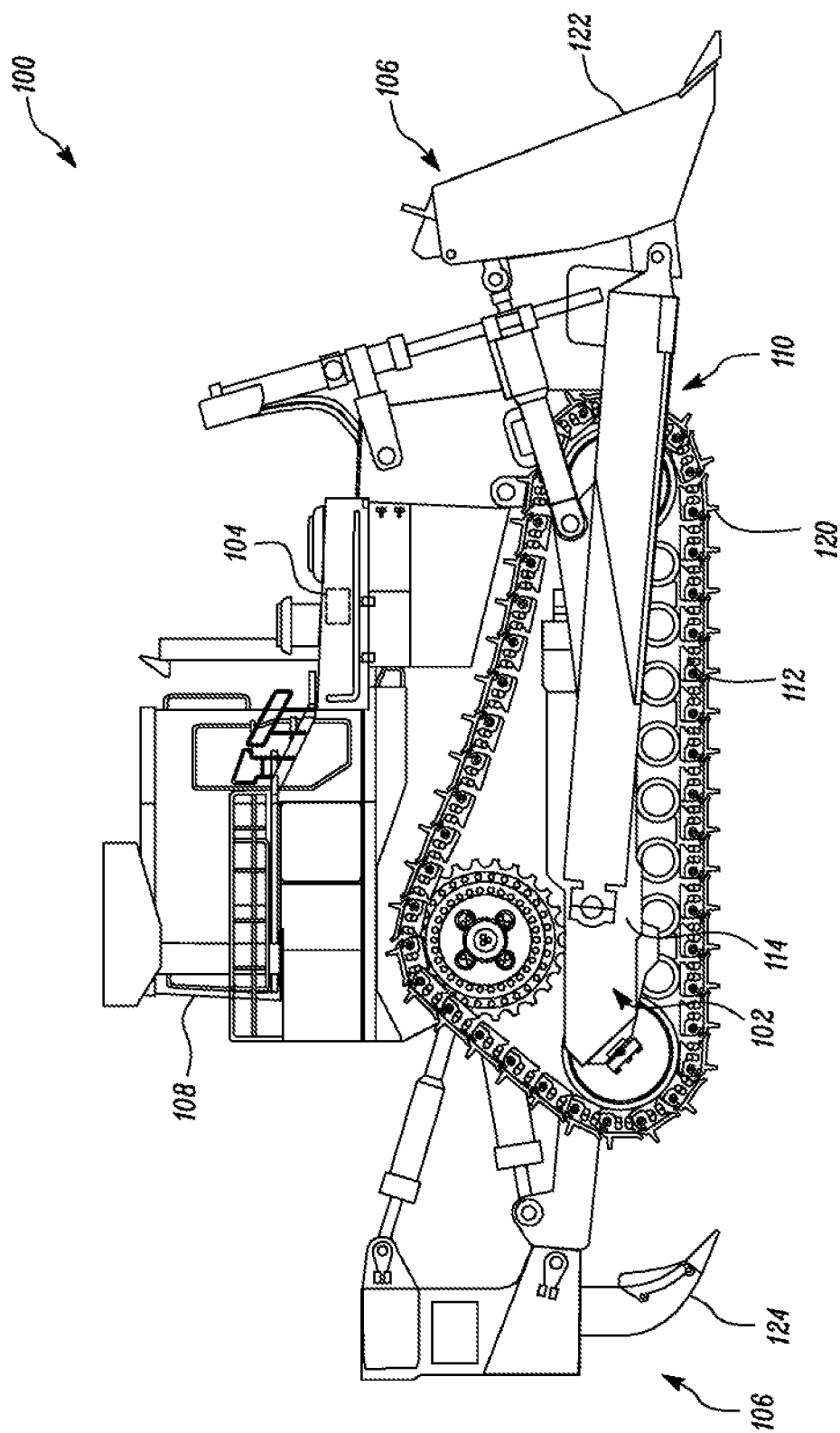
FIG. 1 illustrates a side view of a machine, in accordance with the concepts of the present disclosure.

FIG. 1 illustrates an exemplary machine 100. According to various embodiments of the present disclosure, the machine 100 may include a track-type machine or a wheel-type machine. For example, the machine 100 may be embodied as a loader, a compactor, a dozer, an excavator, or any other similar machine. Further, the machine 100 may be an earth moving machine, a construction machine, a mining machine, an agricultural machine, a forest machine, etc. In the illustrated embodiment, the machine 100 is a dozer.

Figure 2:
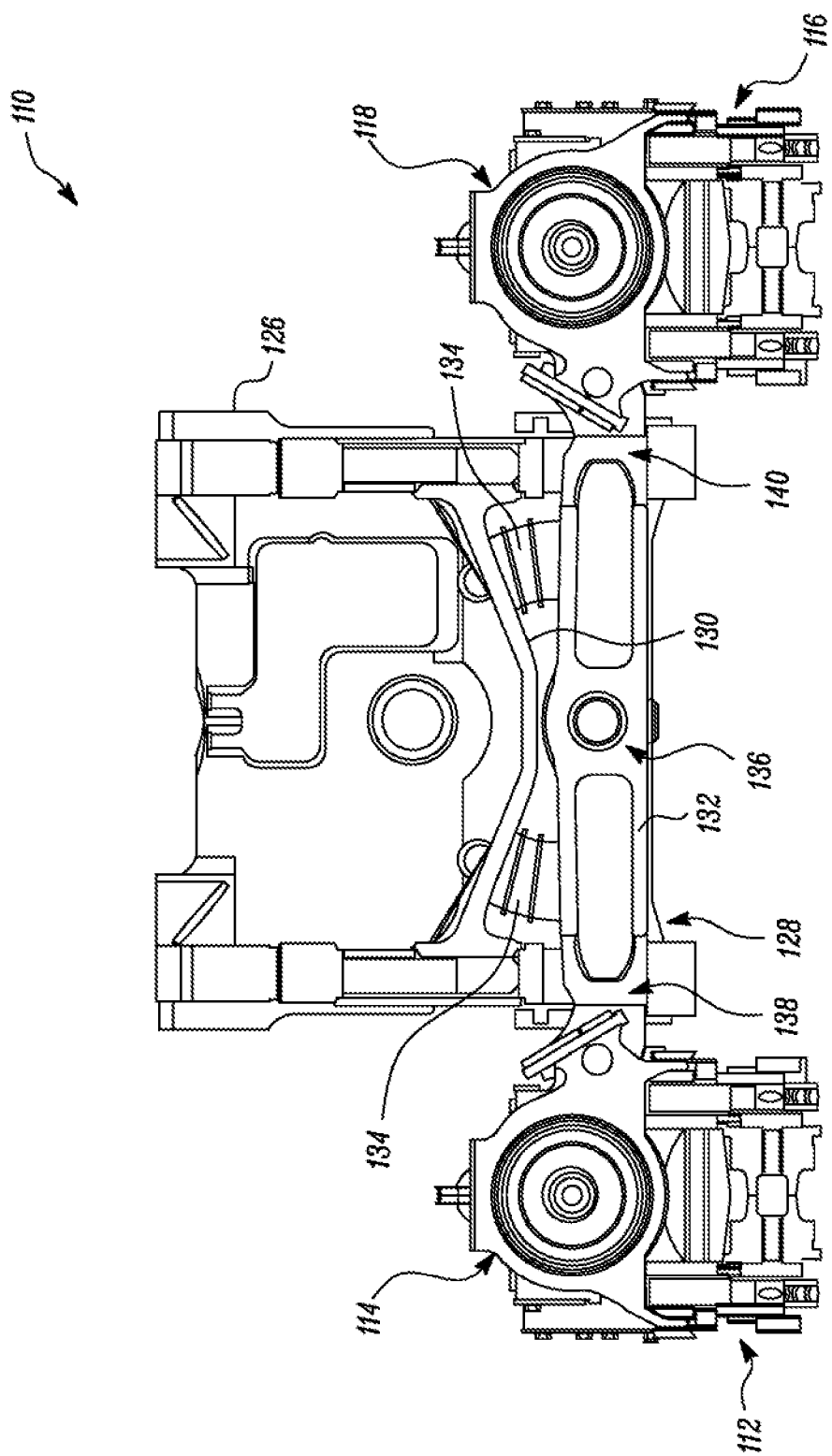
FIG. 2 illustrates an assembly having a main frame with a suspension assembly of the machine, in accordance with the concepts of the present disclosure.

Referring to FIGS. 1 and 2, the machine 100 may include an undercarriage 102, an engine 104, implements 106, an operator station 108, and an assembly 110. The operator station 108, the engine 104, the undercarriage 102, and the implements 106 are coupled to and supported by a main frame assembly 126 (shown in FIG. 2) of the assembly 110.

The undercarriage 102 may include a first track 112 supported on a first track frame 114, and a second track 116 supported on a second track frame 118 (shown in FIG. 2). The first track 112 and the second track 116 may include a plurality of track shoes 120. Further, the first track 112 and the second track 116 may be powered by the engine 104 to propel the machine 100.

The engine 104 may be based on one of the commonly applied power-generation units, such as an internal combustion engine (ICE) having a V-type configuration engine, an in-line configuration engine, or an engine with different configurations, as is conventionally known. However, aspects of the present disclosure, need not be limited to a particular type of engine.

The engine 104 may also be configured to power various auxiliary equipment of the machine 100, including the implements 106 for performing work at a worksite. The implements 106 may include a blade, a bucket, a ripper, a hammer, a grapple or any other suitable implements. In the illustrated embodiment, two implements are attached to the machine 100. One of the implement 106 is a blade 122 attached to a front of the machine 100 while the other implement 106 is a ripper 124 attached to a rear of the machine 100.

The engine 104 and all other components of the machine 100 may be controlled by an operator stationed within the operator station 108. The operator station 108 may include a control panel (not shown) for operating the machine 100. The control panel may include physical controls/levers and/or touchscreens, etc.

In an embodiment of the present disclosure, the assembly 110 includes a main frame 126 supported on the undercarriage 102 and a suspension assembly 128, as shown in FIG. 2. The main frame 126 includes a saddle member 130. As illustrated, the saddle member 130 extends transversely with respect to the machine 100 and laterally relative to the main frame 126.

In an embodiment of the present disclosure, the suspension assembly 128 includes an equalizer bar 132 and a pair of suspension sub-assemblies 134 provided between the equalizer bar 132 and the saddle member 130.

The equalizer bar 132 includes a central portion 136, and a pair of distal end portions, such as a first end portion 138 and a second end portion 140. The central portion 136 is pivotally coupled to the saddle member 130, whereas the first end portion 138 and the second end portion 140 are coupled to the first track frame 114 and the second track frame 118, respectively.

The suspension sub-assemblies 134 are positioned laterally spaced apart from one another and are identical in structure. The detailed arrangement and structure of each of the suspension sub-assemblies 134 are further described in conjunction to FIGS. 3 to 7 in the following description.

Figures 3A, 3B:
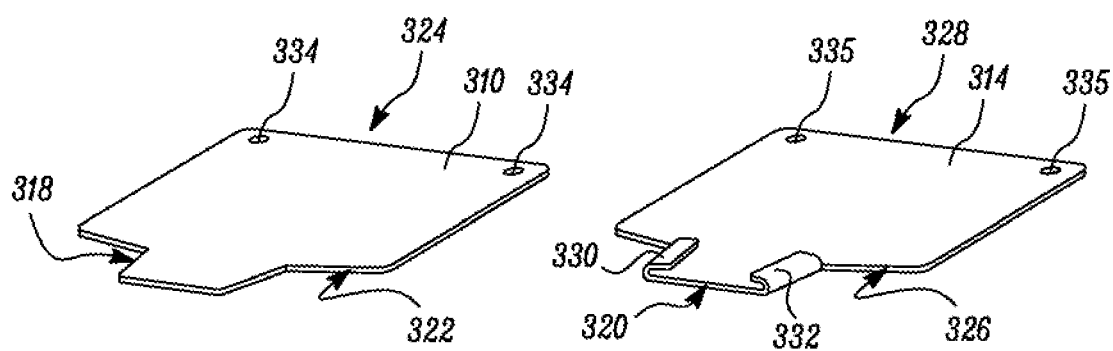
FIG. 3(a) illustrates an exemplary first support plate for a first suspension structure of the suspension assembly, according to an embodiment of the present disclosure.
FIG. 3(b) illustrates an exemplary second support plate for a second suspension structure of the suspension assembly, according to the embodiment of the present disclosure.
Figures 3C, 3D:
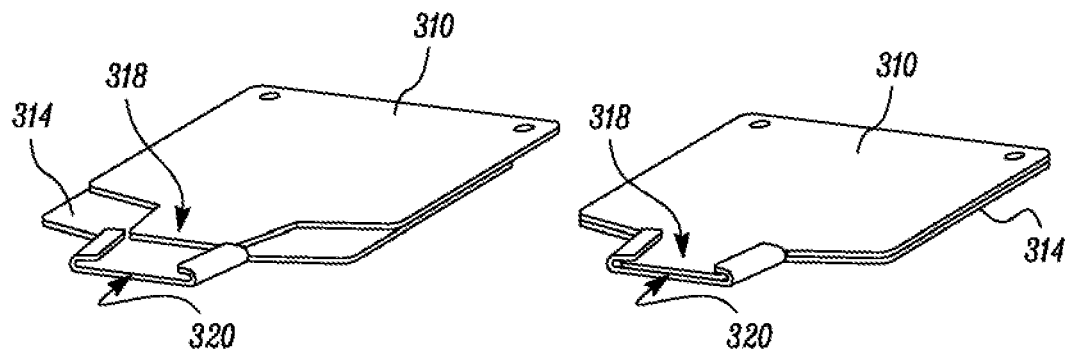
FIG. 3(c) illustrates assembling of the first support plate and the second support plate, according to the embodiment of the present disclosure.
FIG. 3(d) illustrates an assembled first support plate and the second support plate, according to the embodiment of the present disclosure.
Figure 3E:
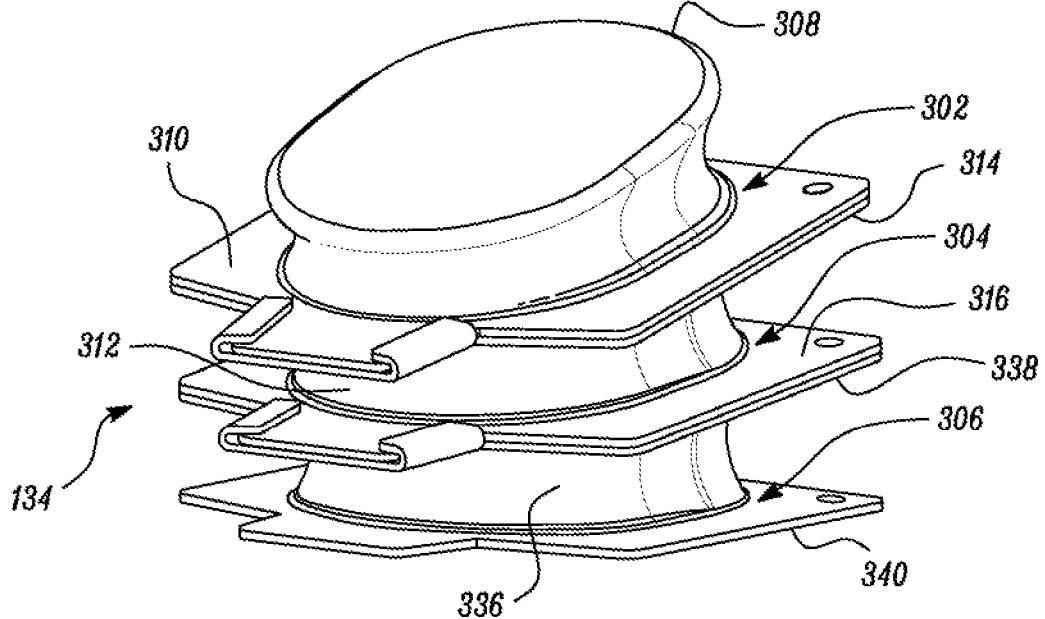
FIG. 3(e) illustrates an assembled suspension assembly, according to the embodiment of the present disclosure.

Referring to FIGS. 3(a) to 3(e), one of the suspension sub-assembly 134 according to an embodiment is disclosed. The suspension sub-assembly 134 includes at least a first suspension structure 302 and a second suspension structure 304. The suspension sub-assembly 134 may further include a third suspension structure 306. The first suspension structure 302, the second suspension structure 304 and the third suspension structure 306 may be arranged in a stacked manner, as shown in FIG. 3(e).

The first suspension structure 302 includes a first suspension pad 308 and a first support plate 310 coupled to a base of the first suspension pad 308. In an example, the first support plate 310 may be molded together with the first suspension pad 308. Alternatively, the first support plate 310 may be attached to the first suspension pad 308 using an adhesive.

The second suspension structure 304 includes a second suspension pad 312 and a second support plate 314 coupled to a top of the second suspension pad 312. The second suspension structure 304 further includes a second base plate 316 coupled to a base of the second suspension pad 312. The second support plate 314 and the second base plate 316 may also be coupled to the second suspension pad 312 in a similar manner as described above for the first support plate 310. Further, the second base plate 316 is identical in structure with respect to the first support plate 310 of the first suspension structure 302.

The first suspension pad 308 and the second suspension pad 312 may be rubber pads that are configured to compress and dampen the movement of the main frame 126 relative to the equalizer bar 132, when the machine 100 moves on a rough terrain. The first support plate 310, the second support plate 314 and the second base plate 316 may be made up of metal in order to provide fixture and positioning for the suspension pads between the equalizer bar 132 and the main frame 126.

According to an embodiment of the present disclosure, the first support plate 310 includes a first interlock component 318 (FIG. 3(a)). The second support plate 314 includes a second interlock component 320 formed therein (FIG. 3(b)). The second interlock component 320 is complimentary to the first interlock component 318 of the first support plate 310, such that the two engage with one another to interlock the first support plate 310 and the second support plate 314 together, as shown in FIGS. 3(c) and 3(d).

It may be contemplated that for the sake of simplicity, FIGS. 3(a) to 3(d) show only the interlocking of the first support plate 310 and the second support plate 314, but in actual, the respective suspension pads are also coupled to the plates.

According to an embodiment of the present disclosure, the first support plate 310 includes a first end 322 and a second end 324. The first interlock component 318 is a flat tab extending from the first end 322, as shown in FIG. 3(a). Further, as shown in FIG. 3(b), the second support plate 314 includes a first end 326 and a second end 328. The second interlock component 320 includes a flat tab extending from the first end 326 and a pair of bent tabs 330, 332 provided on the opposite sides of the flat tab. The pair of bent tabs 330, 332 are bent inwardly towards each other, such that the flat tab of the first interlock component 318 of the first support plate 310 is aligned, received, and engaged therein, as shown in FIGS. 3(c) and 3(d). Alternatively, the first interlock component 318 and the second interlock component 320 may be swapped, such that, the first interlock component 318 may include the pair of bent tabs 330, 332, whereas the second interlock component 320 may include the flat tab.

Further, the first support plate 310 includes a first set of apertures 334 provided at the second end 324. Similarly, the second support plate 314 includes a second set of apertures 335 provided at the second end 328. The first set of apertures 334 are configured to align with the second set of apertures 335 and receive fasteners therethrough to fasten the first support plate 310 and the second support plate 314, when the plates are interlocked together.

The suspension sub-assembly 134 may further include the third suspension structure 306 having a third suspension pad 336, a third support plate 338 and a third base plate 340. The third support plate 338 is attached a top of the third suspension pad 336 and the third base plate 340 is attached to a base of the third suspension pad 336. The third support plate 338 is identical to the second support plate 314, whereas the third base plate 340 is identical to the second base plate 316, thereby forming the third suspension structure 306 identical to the second suspension structure 304.

The third support plate 338 is interlocked and fastened with the second base plate 316 in a similar manner as described for the first support plate 310 and the second support plate 314 above. The third base plate 340 may be coupled to the equalizer bar 132 through one or more fasteners (not shown).

Figures 4A, 4B:
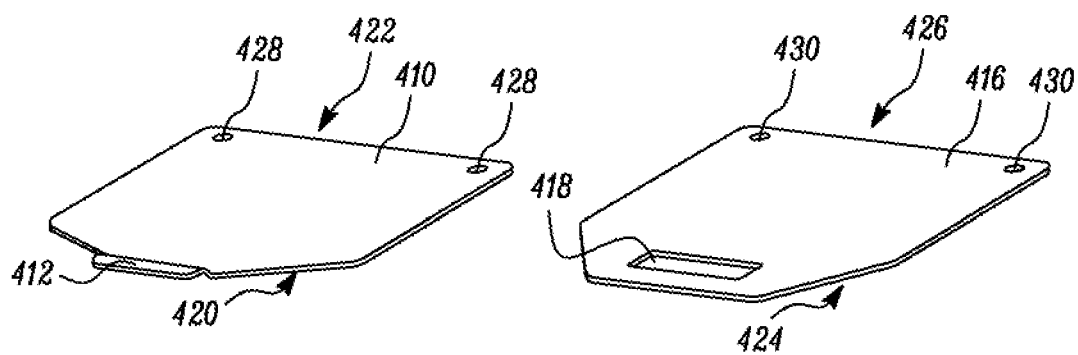
FIG. 4(a) illustrates an exemplary first support plate for a first suspension structure of the suspension assembly, according to a second embodiment of the present disclosure.
FIG. 4(b) illustrates an exemplary second support plate for a second suspension structure of the suspension assembly, according to the second embodiment of the present disclosure.
Figures 4C, 4D:
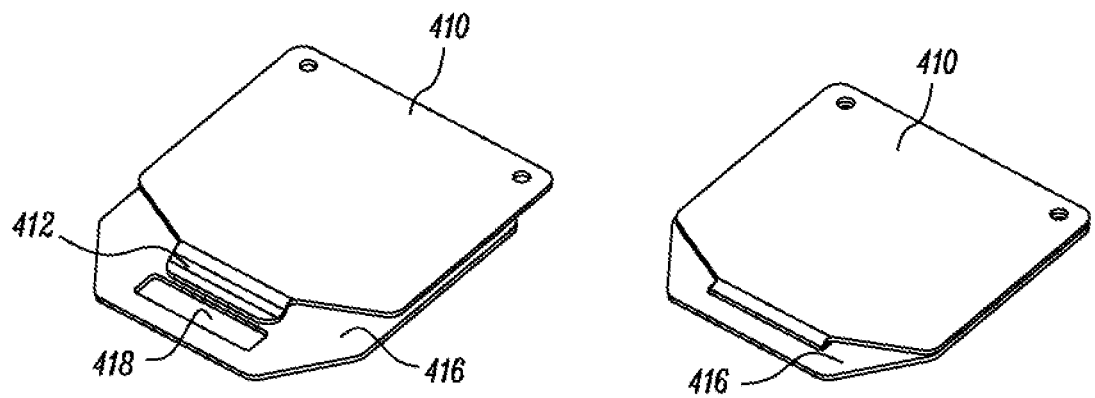
FIG. 4(c) illustrates assembling of the first support plate and the second support plate of the first suspension structure and the second suspension structure respectively, according to the second embodiment of the present disclosure.
FIG. 4(d) illustrates an assembled first support plate and the second support plate, according to the second embodiment of the present disclosure.
Figure 4E:
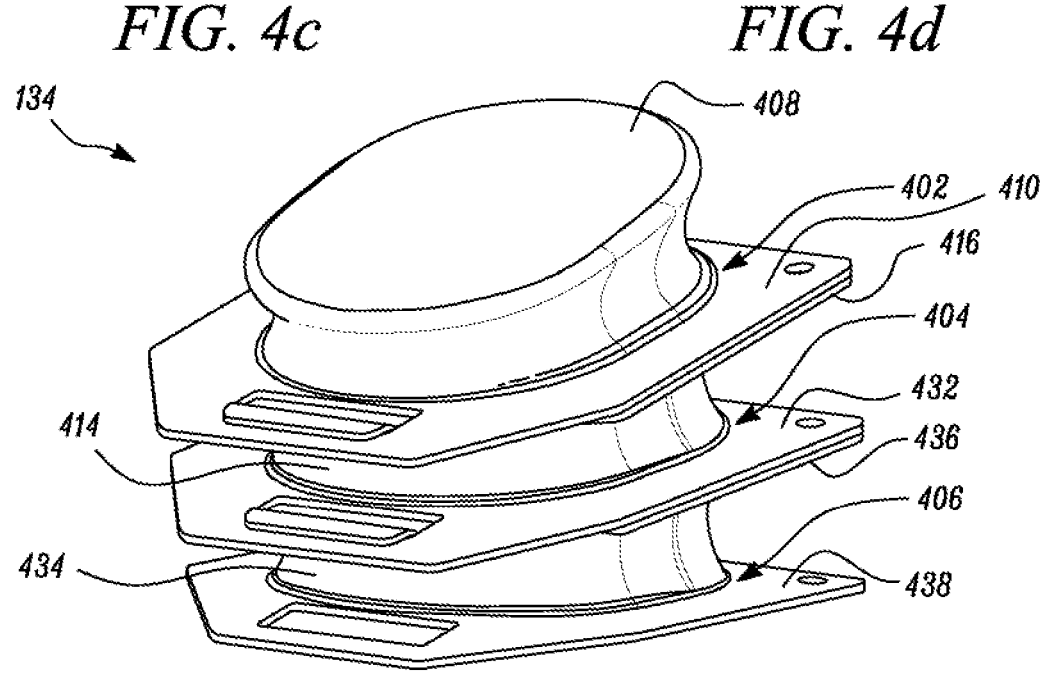
FIG. 4(e) illustrates an assembled suspension assembly, according to the second embodiment of the present disclosure.

FIGS. 4(a) to 4(e) illustrate perspective and exploded views of the suspension sub-assembly 134 according to a second embodiment of the present disclosure. The suspension sub-assembly 134 includes at least a first suspension structure 402 and a second suspension structure 404. Further, the suspension sub-assembly 134 may include a third suspension structure 406. The first suspension structure 402 includes a first suspension pad 408 and a first support plate 410 having a first interlock component 412. The second suspension structure 404 includes a second suspension pad 414 and a second support plate 416 having a second interlock component 418 complimentary to the first interlock component 412, such that the two engage with one another to interlock the first support plate 410 and the second support plate 416 together, as shown in FIGS. 4(c) and 4(d).

In the illustrated embodiment, the first support plate 410 includes a first end 420 and a second end 422, such that the first interlock component 412 includes a double bent tab extending from the first end 420. In an embodiment, the double bent tab is a z-shaped tab extending from the first end 420 of the first support plate 410. Further, the second support plate 416 also includes a first end 424 and a second end 426, such that the second interlock component 418 includes a slot formed proximal to the first end 424. The slot is configured to receive and engage the z-shaped double bent tab of the first support plate 410 in order to interlock the first support plate 410 with the second support plate 416, as shown in FIGS. 4(c) and 4(d). Alternatively, the first interlock component 412 and the second interlock component 418 may be swapped, such that, the first interlock component 412 may include the slot, whereas the second interlock component 418 may include the z-shaped double bent tab.

The first support plate 410 and the second support plate 416 include first set of apertures 428 and second set of apertures 430, respectively, at the corresponding second ends 422, 426, such that the set of apertures 428 and 430 align to receive a fastener therethrough.

The second suspension structure 404 includes a second base plate 432, identical to the first support plate 410, which interlocks the second suspension structure 404 with the third suspension structure 406. For example, the third suspension structure 406 may include a third suspension pad 434, a third support plate 436 coupled to a top of the third suspension pad 434 and a third base plate 438 coupled to a base of the third suspension pad 434. The third support plate 436 is identical to the second support plate 416 and interlocks with the second base plate 432 in a similar manner as the first support plate 410 and the second support plate 416. The third base plate 438 is configured to attach to the equalizer bar 132 to couple the suspension sub-assembly 134 to the equalizer bar 132, through one or more fasteners (not shown).

FIGS. 5(a) to 5(e) illustrate perspective and exploded views of the suspension sub-assembly 134 according to a third embodiment of the present disclosure. The suspension sub-assembly 134 includes at least a first suspension structure 502 and a second suspension structure 504. Further, the suspension sub-assembly 134 may include a third suspension structure 506.

The first suspension structure 502 includes a first suspension pad 508 and a first support plate 510 coupled to a base of the first suspension pad 508. The first support plate 510 includes a first interlock component 518. As illustrated, the first support plate 510 includes a first portion 514 and a second portion 516, such that a width W1 of the first support plate 510 at the first portion 514 is less than a width W2 of the first support plate 510 at the second portion 516. As the width are different, the first portion 514 and the second portion 516 define a pair of shoulder tabs as the first interlock component 518.

Figures 5A, 5B:
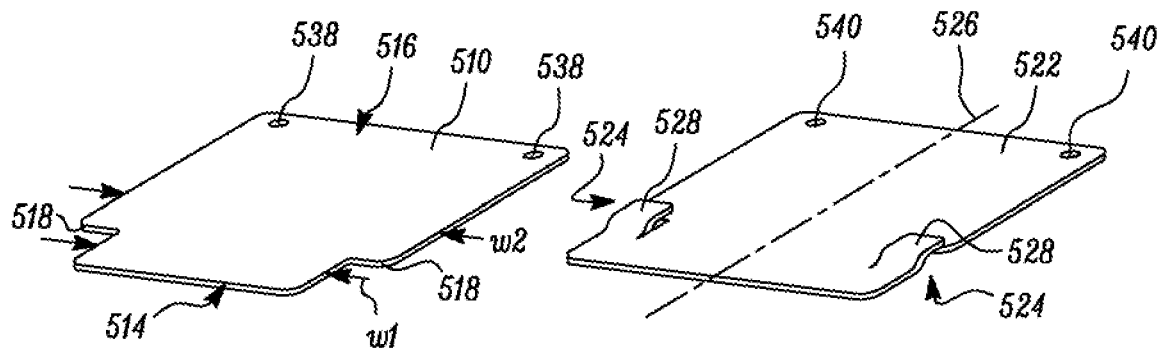
FIG. 5(a) illustrates an exemplary first support plate for a first suspension structure of the suspension assembly, according to a third embodiment of the present disclosure.
FIG. 5(b) illustrates an exemplary second support plate for a second suspension structure of the suspension assembly, according to the third embodiment of the present disclosure.
Figures 5C, 5D:
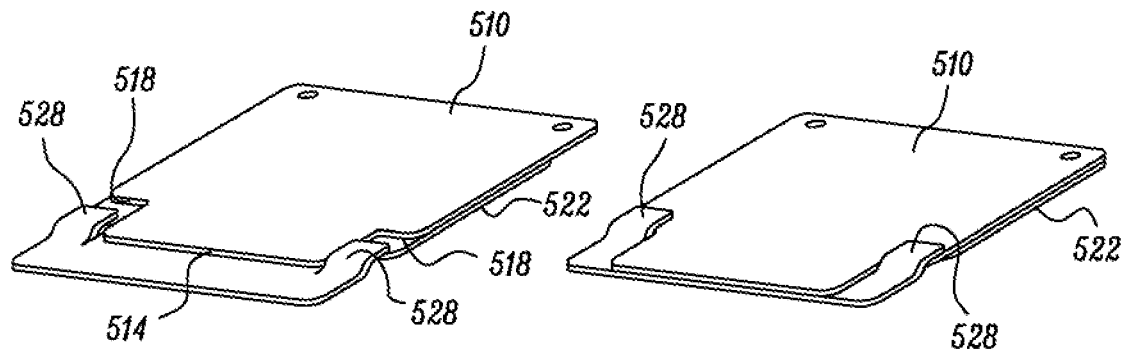
FIG. 5(c) illustrates assembling of the first support plate and the second support plate of the first suspension structure and the second suspension structure respectively, according to the third embodiment of the present disclosure.
FIG. 5(d) illustrates an assembled first support plate and the second support plate, according to the third embodiment of the present disclosure.
Figure 5E:
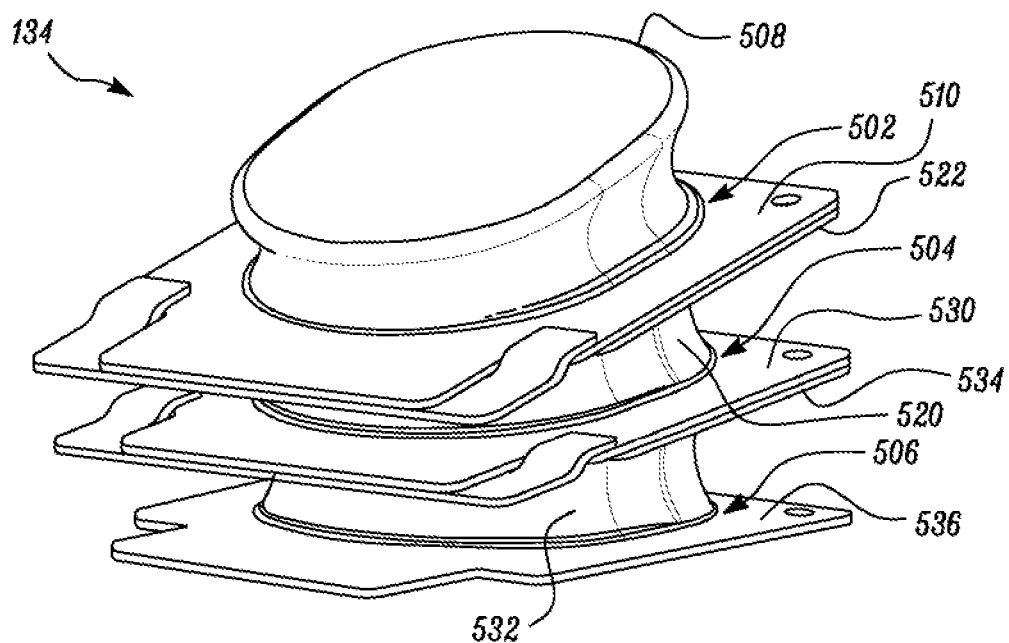
FIG. 5(e) illustrates an assembled suspension assembly, according to the third embodiment of the present disclosure.

The second suspension structure 504 includes a second suspension pad 520 and a second support plate 522 coupled to a top of the second suspension pad 520. The second support plate 522 includes a second interlock component 524 configured to receive and engage with the first interlock component 518 of the first support plate 510. The second support plate 522 defines a longitudinal axis 526 such that the second interlock component 524 includes a pair of laterally spaced apart double bent tabs 528 positioned on each side of the longitudinal axis 526. The double bent tabs 528 are configured to receive the shoulder tabs 518 of the first support plate 510, as shown in FIGS. 5(c) and 5(d).

Alternatively, the first interlock component 518 and the second interlock component 528 may be swapped, such that, the first interlock component 518 may include the pair of double bent tabs 528, whereas the second interlock component 524 may include the pair of shoulder tabs.

Furthermore, the first support plate 510 and the second support plate 522 include first set of apertures 538 and second set of apertures 540, respectively, such that the apertures 538 and 540 align to receive a fastener therethrough to fasten the first suspension structure 502 and the second suspension structure 504 together.

Further, the second suspension structure 504 includes a second base plate 530, identical to the first support plate 510, and configured to interlock the second suspension structure 504 with the third suspension structure 506. For example, the third suspension structure 506 may include a third suspension pad 532, a third support plate 534 coupled to a top of the third suspension pad 532 and a third base plate 536 coupled to a base of the third suspension pad 532. The third support plate 534 is identical to the second support plate 522 and interlocks with the second base plate 530 in a similar manner as the first support plate 510 and the second support plate 522. The third base plate 536 is configured to be attached to the equalizer bar 132 to couple the suspension sub-assembly 134 to the equalizer bar 132, through one or more fasteners (not shown).

FIGS. 6(a) to 6(e) illustrate perspective and exploded views of the suspension sub-assembly 134 according to a fourth embodiment of the present disclosure. The suspension sub-assembly 134 includes at least a first suspension structure 602 and a second suspension structure 604. Further, the suspension sub-assembly 134 may include a third suspension structure 606.

The first suspension structure 602 includes a first suspension pad 608 and a first support plate 610 coupled to a base of the first suspension pad 608. The second suspension structure 604 includes a second suspension pad 612, a second support plate 614 coupled to a top of the second suspension pad 612 and a second base plate 616 coupled to a base of the second suspension pad 612.

The first support plate 610 includes a first end 618, a second end 620 and a first interlock component 622 extending from the first end 618. In an embodiment of the present disclosure, the first interlock component 622 includes a tab portion extending from the first end 618, such that a width W1 of the first support plate 610 at the first end 618 is less than a width W2 of the tab portion. The first support plate 610 may further include a curved portion 624 extending from the second end 620. The curved portion 624 may further include a slot 626 formed therein.

Figures 6A, 6B:
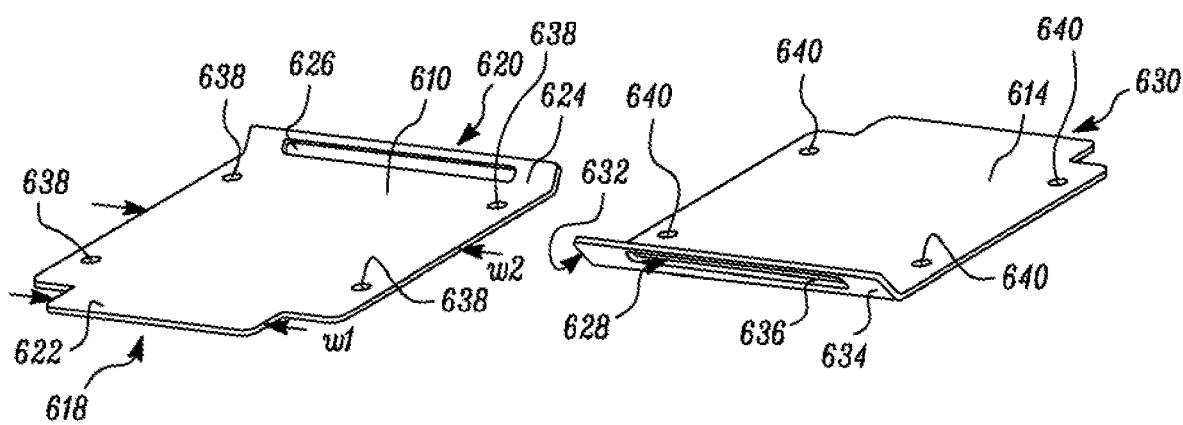
FIG. 6(a) illustrates an exemplary first support plate for a first suspension structure of the suspension assembly, according to a fourth embodiment of the present disclosure.
FIG. 6(b) illustrates an exemplary second support plate for a second suspension structure of the suspension assembly, according to the fourth embodiment of the present disclosure.
Figures 6C, 6D:
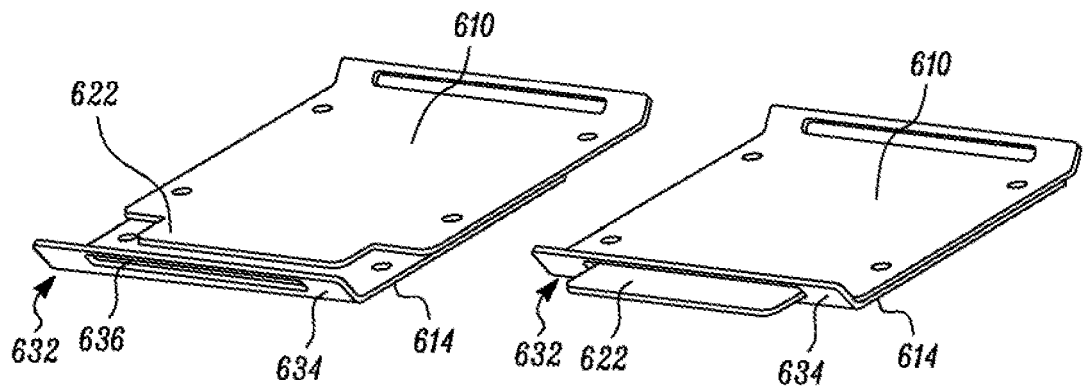
FIG. 6(c) illustrates assembling of the first support plate and the second support plate of the first suspension structure and the second suspension structure respectively, according to the fourth embodiment of the present disclosure.
FIG. 6(d) illustrates an assembled first support plate and the second support plate, according to the fourth embodiment of the present disclosure.
Figure 6E:
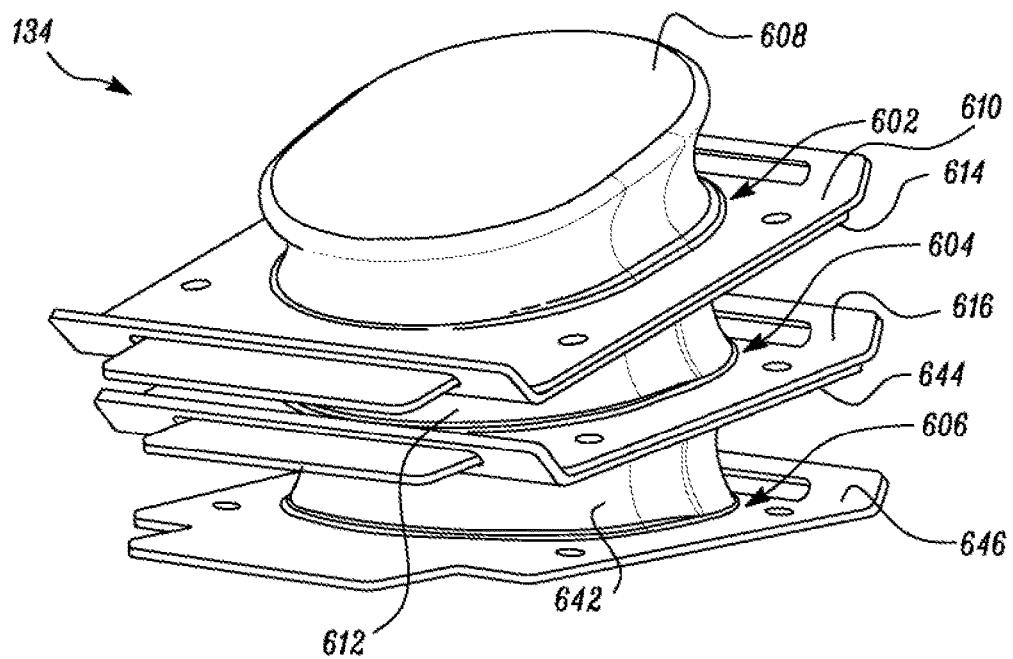
FIG. 6(e) illustrates an assembled suspension assembly, according to the fourth embodiment of the present disclosure.
Figure 7E:
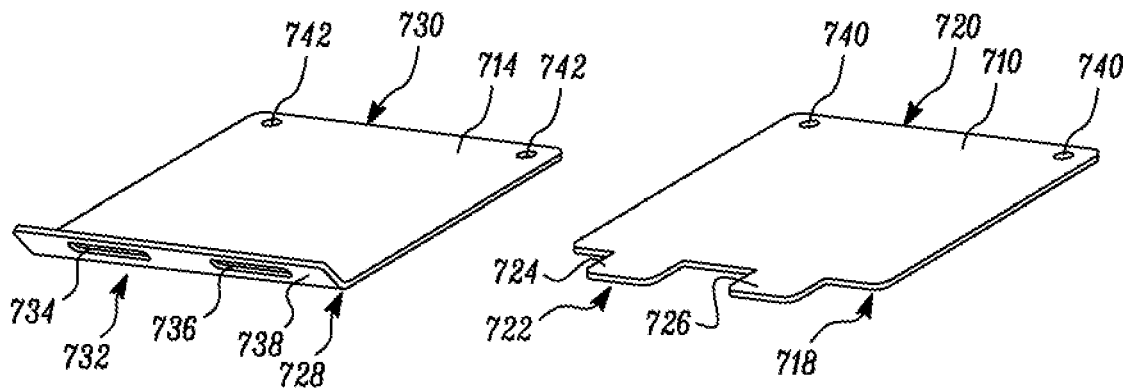
FIG. 7(e) illustrates an assembled suspension assembly, according to the fifth embodiment of the present disclosure.
Figure 7E:
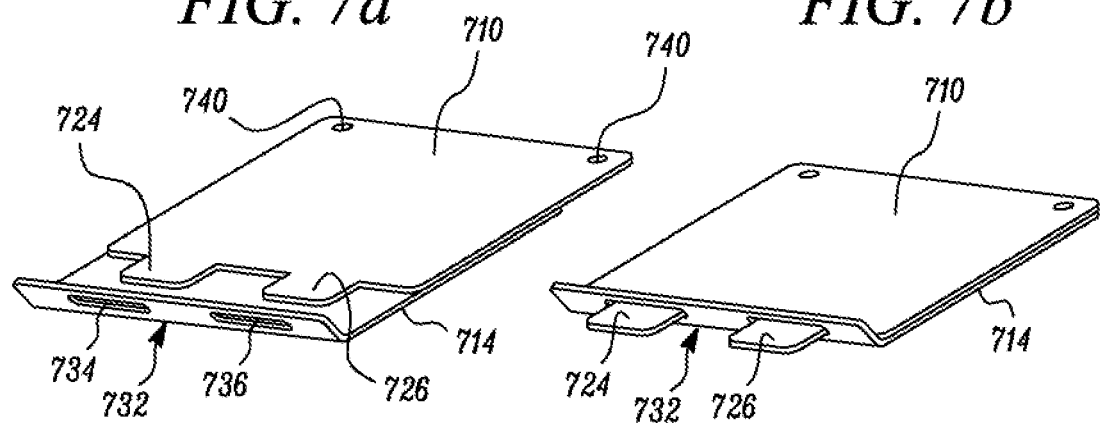
Figure 7E:
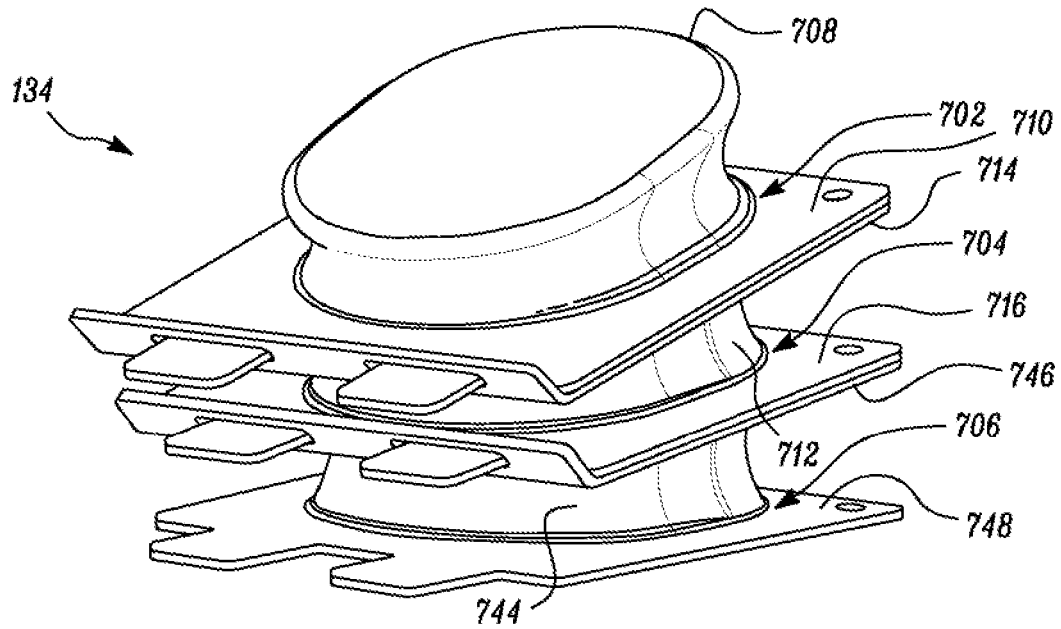

Further, the second support plate 614 includes a first end 628, a second end 630 and a second interlock component 632 extending from the first end 628. For example, the second interlock component 632 includes a curved portion 634 having a slot 636 defined complimentary to the tab portion of the first interlock component 622. The slot 636 receives and engages the tab portion of the first interlock component 622 to interlock the first support plate 610 and the second support plate 614 together, as shown in FIGS. 6(c) and 6(d). The second support plate 614 may further include a tab portion extending from the second end 630, similar to the tab portion of the first support plate 610.

It may be contemplated that the first interlock component 622 and the second interlock component 632 may be swapped for the first support plate 610 and the second support plate 614, without deviating from the scope of the claimed subject matter. For example, in such a case, the curved portion 624 having the slot 626 extending from the second end 620 of the first support plate 610 may act as the first interlock component 622 whereas the tab portion extending from the second end 630 of the second support plate 614 may act as the second interlock component 632.

Furthermore, the first support plate 610 and the second support plate 614 may include a first set of apertures 638 and a second set of apertures 640 respectively. As described above, the first set of apertures 638 align with the second set of apertures 640 to receive a fastener therethrough, in order to fasten the first suspension structure 602 with the second suspension structure 604.

The third suspension structure 606 may include a third suspension pad 642, a third support plate 644 coupled to a top of the third suspension pad 642 and a third base plate 646 coupled to a base of the third suspension pad 642. The third support plate 644 is identical to the second support plate 614 and interlocks with the second base plate 616 of the second suspension structure 604 in a similar manner as the second support plate 614 interlocks with the first support plate 610 of the first suspension structure 602. Furthermore, the third base plate 646 is configured to be attached to the equalizer bar 132 to couple the suspension sub-assembly 134 to the equalizer bar 132, through use of one or more fasteners (not shown).

FIGS. 7(a) to 7(e) illustrate perspective views of the suspension sub-assembly 134 according to a fifth embodiment of the present disclosure. The suspension sub-assembly 134 includes at least a first suspension structure 702 and a second suspension structure 704. Further, the suspension sub-assembly 134 may include a third suspension structure 706.

The first suspension structure 702 includes a first suspension pad 708 and a first support plate 710 coupled to a base of the first suspension pad 708. The second suspension structure 704 includes a second suspension pad 712, a second support plate 714 coupled to a top of the second suspension pad 712 and a second base plate 716 coupled to a base of the second suspension pad 712.

The first support plate 710 includes a first end 718, a second end 720 and a first interlock component 722 extending from the first end 718. In the illustrated embodiment of the present disclosure, the first interlock component 722 includes a pair of laterally spaced flat tabs 724, 726 extending from the first end 718.

Further, the second support plate 714 includes a first end 728, a second end 730 and a second interlock component 732 extending from the first end 728. In the illustrated embodiment, the second interlock component 732 includes a pair of laterally spaced apart slots 734, 736 provided on a curved portion 738 extending from the first end 728. The slots 734, 736 are defined complimentary to the pair of flat tabs 724, 726 of the first interlock component 722. The slots 734, 736 receive and engage the respective flat tabs 724, 726 to interlock the first support plate 710 and the second support plate 714 together, as shown in FIGS. 7(c) and 7(d).

It may be contemplated that the first interlock component 722 and the second interlock component 732 may be swapped for the first support plate 710 and the second support plate 714, without deviating from the scope of the claimed subject matter. For example, in such a case, the first support plate 710 may include the curved portion 738 having the pair of slots 734, 736 that act as the first interlock component 722, whereas the second support plate 714 may include the pair of flat tabs 724, 726 that act as the second interlock component 732.

Furthermore, the first support plate 710 and the second support plate 714 may include a first set of apertures 740 and a second set of apertures 742 respectively. As described above, the first set of apertures 740 align with the second set of apertures 742 to receive a fastener therethrough, in order to fasten the first suspension structure 702 with the second suspension structure 704.

The third suspension structure 706 may include a third suspension pad 744, a third support plate 746 coupled to a top of the third suspension pad 744 and a third base plate 748 coupled to a base of the third suspension pad 744. The third support plate 746 is identical to the second support plate 714 and interlocks with the second base plate 716 of the second suspension structure 704 in a similar manner as the second support plate 714 interlocks with the first support plate 710 of the first suspension structure 702. Furthermore, the third base plate 748 is configured to attach to the equalizer bar 132 to couple the suspension sub-assembly 134 to the equalizer bar 132, through use of one or more fasteners (not shown).

Although, the foregoing description illustrates the suspension sub-assembly 134 with three suspension structures, it may be well contemplated that any number of suspension structures may be assembled in a similar manner, without deviating from the scope of the claimed subject matter.

INDUSTRIAL APPLICABILITY

During assembly, an operator (not shown) may position each of the first suspension structure 302, 402, 502, 602, 702, the second suspension structure 304, 404, 504, 604, 704 and the third suspension structure 306, 406, 506, 606, 706, one over another in a stacked arrangement, such that the respective interlocking components facilitate auto alignment and interlocking of these suspension structures with one another at a first end. In an embodiment, the operator may subsequently fasten these suspension structures at a second end opposite to the first end, by use of fasteners engaged within the aligned apertures thereof, thereby forming the suspension sub-assembly 134.

The above-mentioned interlocking mechanism provided for assembling the suspension sub-assembly 134 facilitates easy installation and maintenance of the suspension assembly 128 of the machine 100. Additionally, the interlocking mechanism eliminates usage of fasteners on the first end. Therefore, when the suspension pads compress more towards the first end, there is no interference of the fasteners with each other thereby increasing the service life of the suspension assembly 128.

While aspects of the present disclosure have been particularly shown, and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A suspension assembly for a machine, the suspension assembly comprising:
    a first suspension structure including:
        a first suspension pad; and
        a first support plate coupled to the first suspension pad, the first support plate having a first interlock component formed therein; and
    a second suspension structure including:
        a second suspension pad; and
        a second support plate coupled to the second suspension pad, the second support plate having a second interlock component formed therein, the second interlock component being complimentary to the first interlock component and configured to engage with the first interlock component; wherein the first interlock component is a double bent tab and the second interlock component is a slot configured to receive the double bent tab therein.

2. The suspension assembly of claim 1, wherein the first suspension structure and the second suspension structure are arranged in a stacked arrangement.

3. A machine comprising:
    a main frame including a laterally-extending saddle member;
    an under carriage supporting the main frame; and
    a suspension assembly comprising:
        an equalizer bar having a central portion and a pair of distal end portions, the central portion pivotally coupled to the saddle member, and each of the pair of distal end portions coupled to the under carriage;
        a first suspension structure including:
            a first suspension pad; and
            a first support plate coupled to the first suspension pad, the first support plate having a first interlock component formed therein; and
        a second support structure including:
            a second suspension pad; and
            a second support plate coupled to the second suspension pad, the second support plate having a second interlock component formed therein, the second interlock component being complimentary to the first interlock component and configured to engage with the first interlock component; wherein the first interlock component is a double bent tab and the second interlock component is a slot configured to receive the double bent tab therein.

4. The machine of claim 3, wherein the first suspension structure and the second suspension structure are arranged in a stacked arrangement.

* * * * *